July 15, 1947.  F. F. GUNTHER  2,424,161
ELECTRIC BOTTLE WARMER
Filed June 30, 1944  2 Sheets-Sheet 1

Inventor
FREDERICK F. GUNTHER.
by
Attys.

July 15, 1947.　　　　F. F. GUNTHER　　　　2,424,161
ELECTRIC BOTTLE WARMER
Filed June 30, 1944　　　　2 Sheets-Sheet 2

Inventor
FREDERICK F. GUNTHER.

Patented July 15, 1947

2,424,161

UNITED STATES PATENT OFFICE 2,424,161

ELECTRIC BOTTLE WARMER

Frederick F. Gunther, Chicago, Ill., assignor to Helmco, Inc., Chicago, Ill., a corporation of Illinois Application June 30, 1944, Serial No. 542,958

4 Claims. (Cl. 219—43)

This invention relates to bottle heaters and is directed more particularly to dispensing devices in which prepared products, in bottles, are disposed and warmed to elevated temperatures.

In heating products in their containers, it is customary to maintain a relatively large bath of water at the desired temperature and to place the containers in this bath. For purposes of economy and efficiency, the heating element is ordinarily relatively small as compared with the expanse and the volume of heating liquid effected thereby, with the result that the heating liquid in the past has become stratified so that certain containers disposed therein will be elevated to the desired temperature while others will be comparatively cool. This condition has been found to be undesirable since those containers which are insufficiently heated are merely maintained at that lukewarm temperature at which beverages, otherwise made attractive to the taste are rendered somewhat disagreeable to the taste.

Accordingly, as an important object of the present invention, there is provided herein a heating apparatus in which a relatively large volume of heating fluid is maintained at uniform temperature throughout, without the use of mechanical agitators, by means of a relatively small heating unit.

It is another object of the present invention to provide a heating apparatus for a relatively large bath of liquid in which there is provided means for directing the flow of the liquid in such a manner that it passes in close proximity to the heating element and thence upwardly through the normally colder regions to heat the same, thence through a reverse course toward the heating medium where it is again heated, this cycle serving to efficiently maintain objects in the bath at an even, elevated temperature though they be disposed at varying distances from the heating element due to the general path of flow and the eddy turbulence created.

Many other objects and advantages of the invention will become apparent from the following description and accompanying drawings, in which.

It will be understood that the embodiment shown herein is for illustrative purposes and may be changed or modified without departing from the spirit and scope of the invention as set forth in the appended claims.

Figure 1:
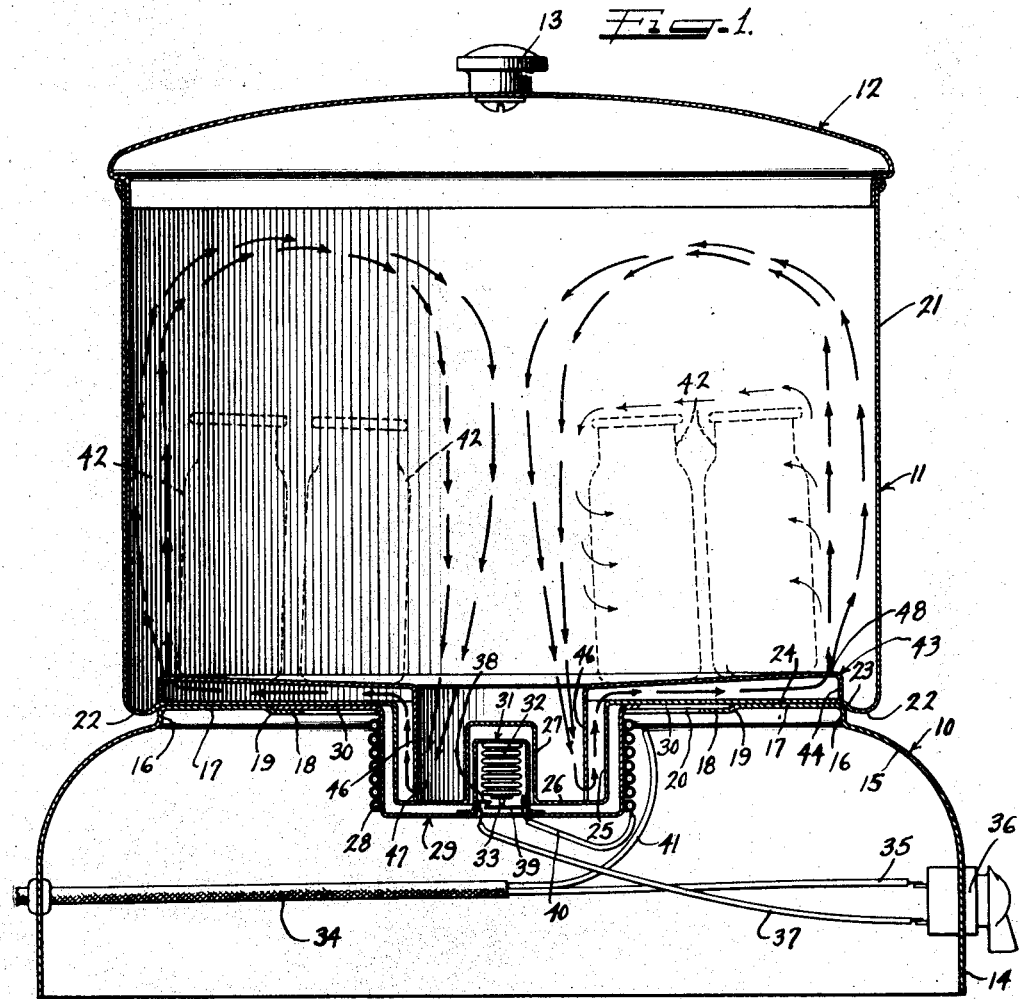
Figure 1 is a vertical cross-section through a heating assembly embodying my invention.

As shown in Figure 1, the heater includes a base 10 and a container or receptacle 11 having a cover 12 provided with an insulated handle 13. The base includes a generally upstanding lower portion 14 merging into a radially inwardly curved portion 15 which terminates in an upstanding flange 16. This flange 16 in turn terminates in a radially inwardly extending annular platform portion 17 which terminates in a radially inwardly extending flange 18 that is joined to the portion 17 by means of a stepped or shouldered portion 19 whereby the flange 18 is disposed on a plane somewhat lower than the portion 17. As will be seen, the flange 18 defines an aperture 20 in the upper part of the base 10.

The container includes a cylindrical side wall 21 extending downwardly and merging into a circular, depending bead 22 which fits over and outside of the flange 16, this bead being defined on the inner side by a shoulder 23 which defines the outer edge of an annular base part 24 that seats upon the portion 17 of the base when the container 11 is aligned therewith by cooperation of the bead 22 with the flange 16.

The portion 24 of the container 11 extends radially inwardly and terminates in a depending skirt 25 which in turn merges with a bottom part 26 having an upwardly extending inverted cup part 27 disposed centrally thereof. Thus it will be seen that the portions 25 and 26 form generally a well or a protuberant cup in the bottom of the container or receptacle 11.

Inserted concentrically in the aperture 20 of the base is a heating assembly which includes a filament 28 wound around a cup member 29 having a radially outwardly extending flange 30 at the upper edge thereof. The flange 30, it will been seen, defines a circle larger than that defined by the inner edge of the flange 18 of the base, whereby the outer part of the flange 30 overlaps the flange 18 on the base to afford a centering seat for the heating assembly on the base with the outer edge of the flange 30 centered against the offset circular portion 19 at the inner edge of the annular part 17 of the base.

The cup member 29 is further provided in the lower side thereof with a central aperture above which is mounted an inverted cup 31 to the upper inner surface of which is secured a heat responsive element 32. This element may be of any desired type but is shown herein as the bellows type and includes a lower abutment member 33.

The electrical arrangement for energizing the heating element 28 includes an incoming line 34, one lead of which as shown at 35 is connected with one side of a switch 36. The other side of the switch 36 is connected by a lead 37 to a contact 38 which cooperates with a resilient contact arm 39 normally sprung upwardly into engagement therewith. The contact arm 39 is connected with the lead 40 which is turn connects with one side of the heating element 28, a lead 41 connecting the other side of the heating element 28 to the source of power. Thus it will be seen that when the switch 36 is turned on and the arm 39 is in its upper position the heating element 28 will be energized. As the thermostat 32 becomes heated the member 33 thereof moves downwardly to engage the resilient arms 39 to break the contact with contact member 38, whereupon the heating element 28 is thrown out of the circuit and deenergized.

From the foregoing it will be seen that the depending central portion of the container 11 which is defined by walls 25 and 26 and by the inverted caps 27 efficiently seals the inner part of the container from the base and particularly the heating element 28 and the thermostat 32. Thus, there is no danger of short circuiting and the efficient operation of the heating parts is assured.

Furthermore, this depending well is intimately associated with the heating system so that liquid within the container, and particularly within the well thereof is heated by radiation through the cup 29 of the heating assembly and walls 25 and 26 of the container.

As is well known, this liquid which is efficiently heated in the well of the container immediately rises therein upon attaining the elevated temperature and it is another aspect of the present invention to control the flow of this heated liquid so that it will be evenly and properly distributed throughout the body of the container, and around bottles 42 therein so that the latter are uniformly heated irrespective of their proximity to the center of the container and thus to the thermostat.

Figure 2:
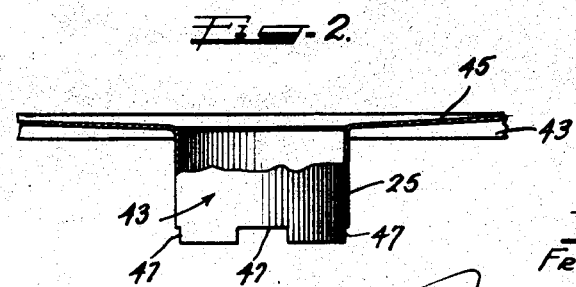
Figure 2 is a fragmentary view partly in elevation and partly in cross-section of a support member for articles being heated.
Figure 3:
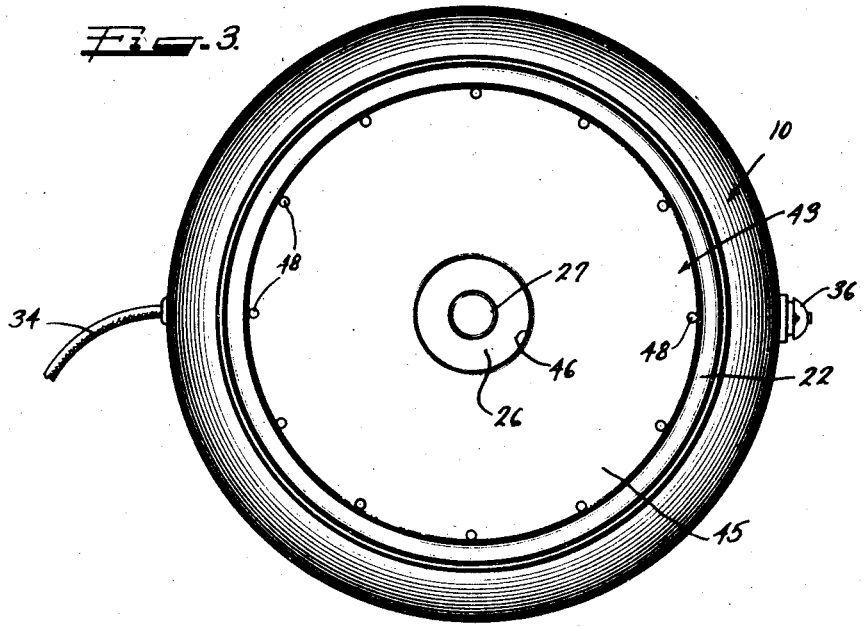
Figure 3 is a top plan view of the structure of Figure 1 with the cover removed and with the false bottom therein.
Figure 4:
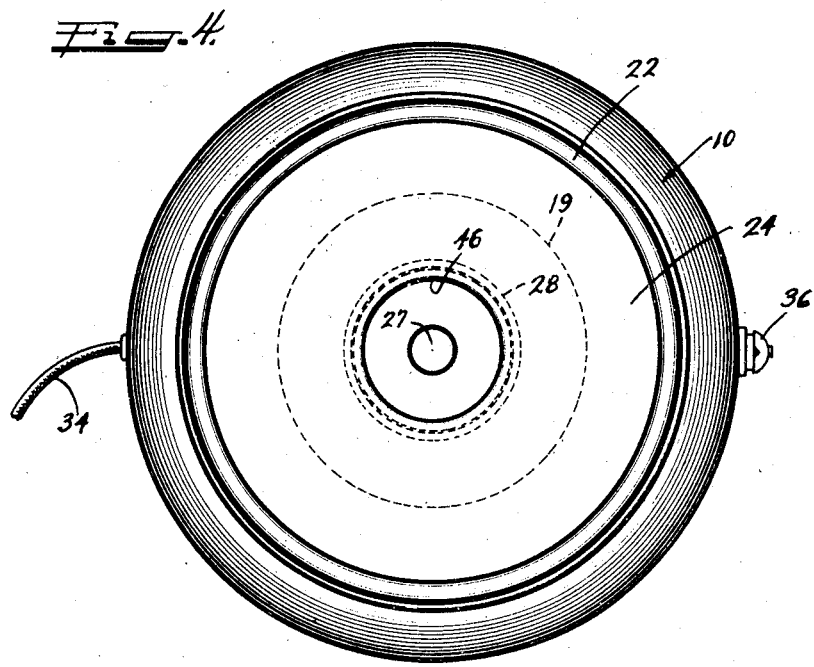
Figure 4 is a top plan view similar to Figure 3 with the false bottom removed.

As shown in Figures 1 and 2 there is provided within the container a false bottom element 43 which includes a depending marginal skirt 44 defining a circle substantially like that defined by the inner portion of the groove 22 in the container 11. This skirt 44 merges at its upper part with an annular, radially inwardly, downwardly inclined platform part 45 which in turn merges with a depending cylindrical skirt 46 that fits downwardly into the depending wall of the container 11 in spaced relationship from the wall 25 thereof. As shown in Figure 2 the wall 46 is provided at the lower edge thereof with a plurality of recesses 47 the purpose of which will be explained presently. It will be seen that the depth of the skirt 46 of the false bottom is such that it comes to rest upon the bottom 26 of the wall in the container 11 when the lower edge of the skirt 44 is disposed upon the adjacent portion of the bottom of the container.

With the foregoing construction it will be seen that a heating medium such as water or the like within the container 11 will be enabled to flow from one side of the skirt 46 to the other side thereof through the openings 47. After the parts have been assembled as shown in Figure 1, the container 11 has been filled with a heating medium such as water and the bottles 42 have been disposed therein, the switch 36 is turned on to energize the heating element 28. The heating element then heats the well in the container and particularly the annular zone defined on its outer side by the circular wall 25 of the well of the container and the skirt 46 of the insert 43. The liquid in this zone, being heated, will rise and be deflected by the inclined surface part 45 of the member 43 to travel radially outwardly until it reaches the radially outer edge thereof, whereupon it rises through openings 48 and then rises upwardly along the inner surface of the wall 21 of the container as shown by the heavy arrows in Figure 1. During this action it will be seen that liquid passing from the heated annular space must be replaced through the openings 47 from the inner side of the skirt 46, this liquid being taken from the central portion of the liquid in the container. Thus the rising liquid, when it reaches the top of the container, is deflected radially inwardly and then downwardly so that the circulatory system established is on the order of a torus in the container 11. During this action of the liquid, eddy turbulence is set up in the container as shown by the light arrows in Figure 1 with the result that the liquid is thoroughly mixed and is heated homogeneously to an elevated temperature. The action of these eddy currents are shown only on the right-hand side of Figure 1, it being understood that the action is the same in the left-hand, shaded portion thereof.

In this manner it will be seen that the heated liquid is thoroughly distributed throughout the container and furthermore that as the liquid becomes cooled it is impelled toward the center where it immediately travels downwardly not only due to the drop in temperature but also due to the necessity of replacement of liquid within the skirt 46.

Another advantage of this construction is that the thermostatic control element is disposed in such a position that it is affected to a greater degree by the cooler liquid rather than by the hotter liquid with the result that it is controlled by minimum conditions within the container 11 rather than by maximum conditions at certain stratified points thereof.

What I claim is:

1. A device for heating food products while in their containers such as bottles or cans, comprising a base and a separable receptacle for receiving a liquid to be heated and to receive a plurality of packages of food products to be heated, said base having a top with a well in it, heating means surrounding the exterior of said well, said receptacle having a protuberant cup in its bottom to enter the base well when the receptacle is in place on the base, and means within the receptacle for supporting a plurality of food packages above the receptacle bottom and for deflecting liquid heated in the cup radially outwardly thereof and up along the receptacle wall.

2. In a device for heating food products while in their containers such as bottles or cans, a base having an upper surface with a well in it, heating coil means about the exterior of said well and beneath said upper surface, a removable receptacle supported on said base and having a protuberant cup to enter said well when the receptacle is in place on the base, means within the receptacle for supporting a plurality of bottles and the like to be heated, said means having parts for supporting it above the bottom of the receptacle, one of said parts being entered in said cup for defining with the wall thereof an annular heating zone between it and said cup wall, and said supporting means deflecting rising liquid heated in said zone radially outwardly toward the receptacle wall.

3. A heating device for heating a plurality of bottles of food products or the like, comprising a base having an upper surface with a cylindrical well in it, a heating coil about the exterior of said well and beneath the said upper surface of the base, a removable container for receiving liquid to be heated supported on said base and having in its bottom a protuberant cup portion enterable in the base well when the container is in place on the base, a false bottom member within the container and in the form of a ring for supporting a plurality of bottles to be heated, said false bottom member having an outer peripheral flange downturned to engage the container bottom adjacent the container wall and having a downturned inner peripheral flange to engage the bottom of the container cup, the flanges of said false bottom member mounting said member in place in said container with its bottle supporting surface spaced above the surface of the container bottom, the inner peripheral flange of said false bottom member being spaced inwardly from the wall of the container cup to define therebetween an annular heating zone adjacent the heating coil about the well, the said false bottom member constituting means for deflecting the rising heated fluid from said zone radially and substantially horizontally to the wall of the container.

4. A heating device for heating a plurality of bottles of food products or the like, comprising a base, a bottle container separable from the base and mounted on it, said base and container having nesting well and cup portions to subject a portion of the liquid in the container to heat, said base carrying heating means surrounding its nestable portion and protected from liquid in the container by the base, and a false bottom member in the container having flange means supporting it above the container bottom, one of the flanges of said false bottom member being entered in the nestable portion of the container to define with the wall of said portion a heating zone, and said false bottom member supporting bottles and the like in the liquid within the container and constituting means for directing heated fluid rising from said heating zone radially outwardly toward the container wall.

FREDERICK F. GUNTHER.

REFERENCES CITED

The following references are of record in the file of this patent:

UNITED STATES PATENTS

| Number | Name | Date |
|---|---|---|
| 2,025,515 | Jones | Dec. 24, 1935 |
| 968,441 | Ayer | Aug. 23, 1910 |
| 1,719,498 | Bernard | July 2, 1929 |
| 2,142,381 | Sickinger | Jan. 3, 1939 |
| 2,158,681 | Schulte | May 16, 1939 |
| 2,221,595 | Lockwood | Nov. 12, 1940 |
| 2,308,603 | Graham | Jan. 19, 1943 |
| 2,314,592 | McCormick | Mar. 23, 1943 |